United States Patent
Franzreb

[15] 3,665,542
[45] May 30, 1972

[54] PORTABLE POWER SCRUBBER WITH LEVERAGED PRESSURE FEATURE

[72] Inventor: Thomas G. Franzreb, Rolling Hills, Calif.
[73] Assignee: Purex Corporation, Ltd., Lakewood, Calif.
[22] Filed: Dec. 3, 1970
[21] Appl. No.: 94,762

[52] U.S. Cl. .................................................15/98, 244/1 R
[51] Int. Cl. .................................................B64f 5/00
[58] Field of Search...............15/98, 103, 103.5, 97, 320, 15/321; 118/207, 108; 244/1

[56] References Cited

UNITED STATES PATENTS

| 3,268,935 | 8/1966 | Ungeheuer | 15/98 X |
|---|---|---|---|
| 2,900,952 | 8/1959 | Perry | 15/103.5 X |
| 3,551,934 | 1/1971 | Franzreb | 15/97 R |
| 2,559,295 | 7/1951 | Grossenbacher | 15/98 |
| 2,190,576 | 2/1940 | Sisman | 15/50 C |
| 3,035,331 | 5/1962 | Wieman | 29/129.5 |
| 3,228,398 | 1/1966 | Leonard | 15/244 R |

*Primary Examiner*—Leon G. Machlin
*Attorney*—White, Haefliger & Bachand

[57] ABSTRACT

A portable scrubbing device for cleaning aircraft skin surfaces including on a carriage, a hand operated wand having a cleaning head and a handle at opposite ends, power driven brush means at the cleaning head, and means supporting the wand slidably intermediate its ends including structure mounting the wand for pivoted movement by an operator grasping the handle to variously apply the cleaning head to the surfaces to be cleaned.

6 Claims, 6 Drawing Figures

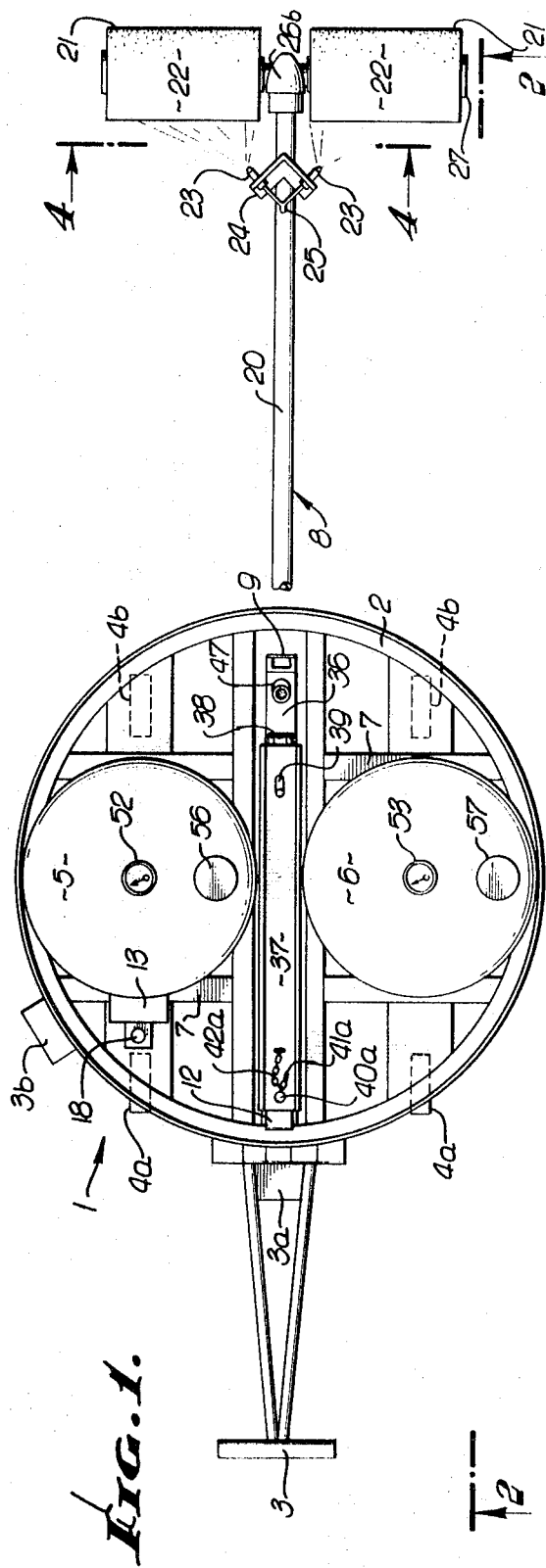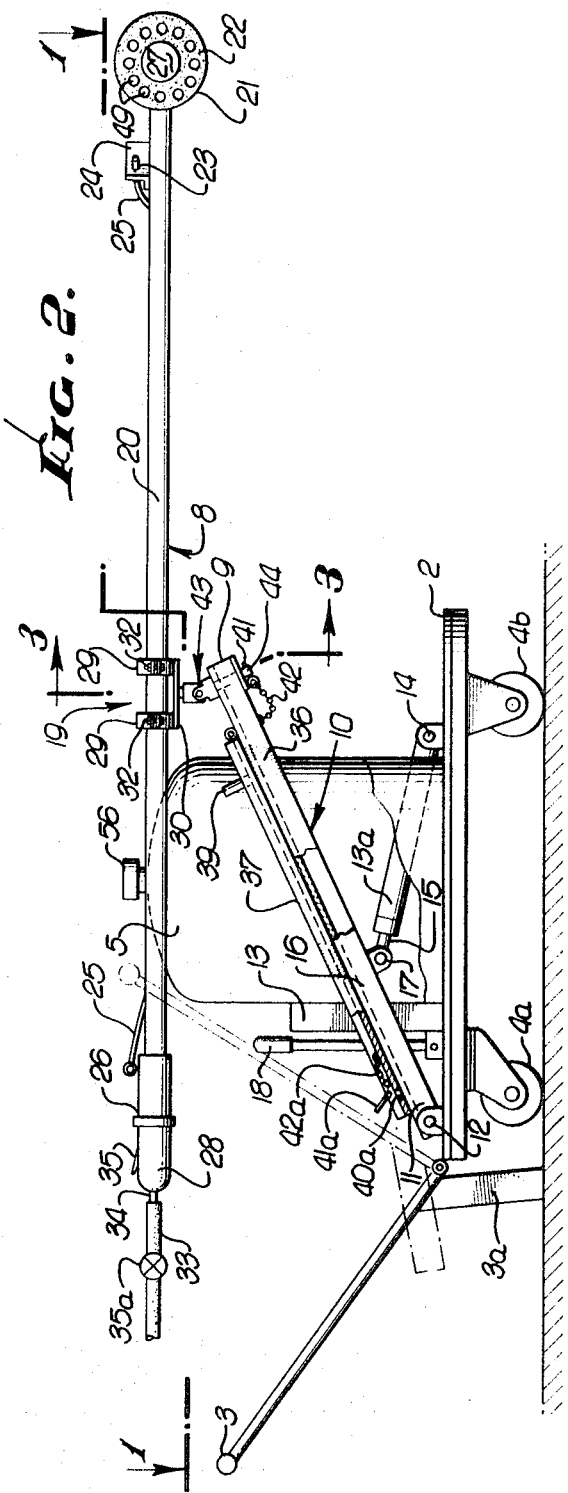
INVENTOR.
THOMAS G. FRANZREB
By White, Haefliger & Bachand
ATTORNEYS.

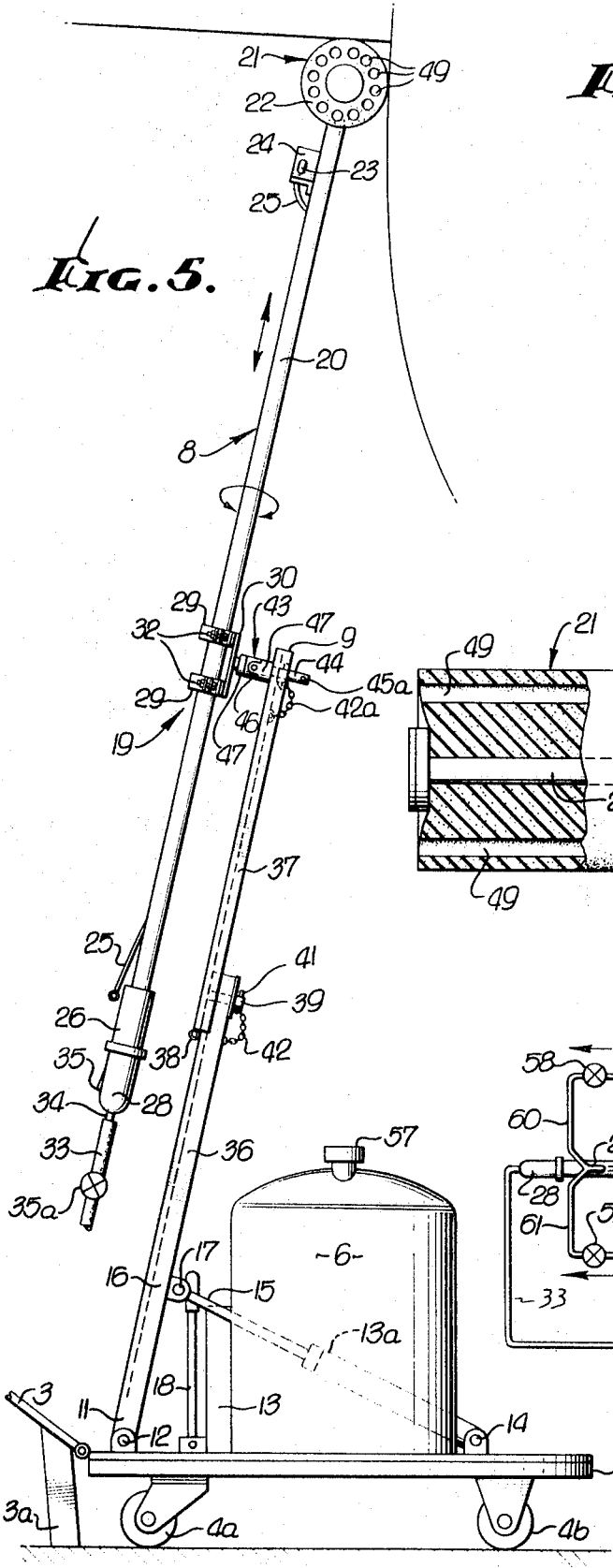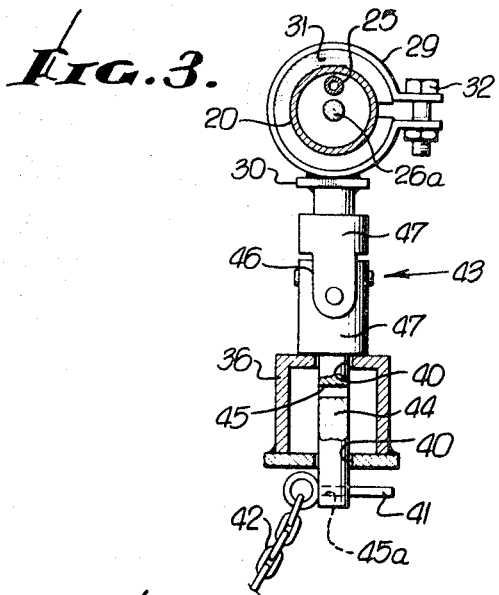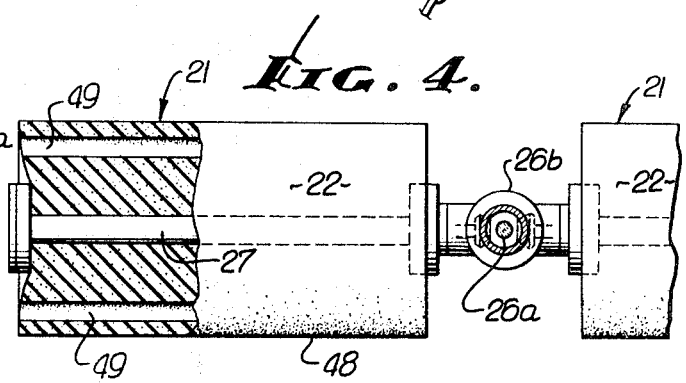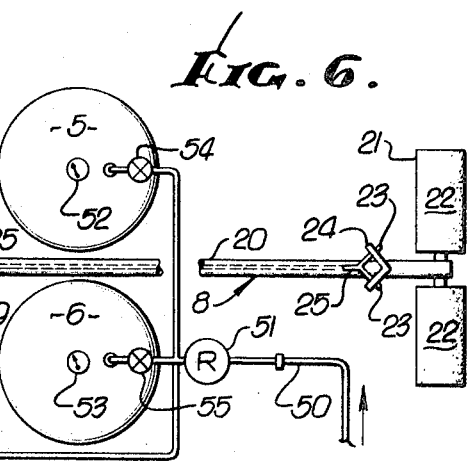

PORTABLE POWER SCRUBBER WITH LEVERAGED PRESSURE FEATURE

BACKGROUND OF THE INVENTION

This invention has to do with improved cleaning devices particularly adapted to the effective cleaning of aluminum skins of aircraft without scratching, abrading or otherwise marring such surfaces. More specifically the invention is concerned with power driven cleaning devices which may be hand directed to scrub aircraft skin surfaces with pressures in excess of those normally conveniently realizable with operator strength alone.

PRIOR ART

Numerous scrubbing devices have been devised but none to my knowledge have combined the features of my device, as hereinafter described, which enable thorough cleaning, without surface damage, by a single operator, and rapidly with varying degrees of pressure and at different angles of application.

SUMMARY OF THE INVENTION

My invention provides a portable scrubbing device for cleaning aircraft skin surfaces including a hand operated wand having a cleaning head at one end and a handle at the opposite end, the cleaning head including a power driven brush means; and means supporting the wand intermediate its ends including structure mounting the wand for pivoted movement by an operator grasping the handle to variously apply the cleaning head to the surfaces to be cleaned. The device may further include, as the wand mounting structure, a boom which may have multiple sections to be length adjustable, the boom being mounted on a carriage for the device and carrying a swivel connector above the carriage. The swivel connector may comprise a sleeve pivotably secured to the boom and adapted to slidably receive the wand. A motor may be provided for driving the brush means and a cleaning fluid supply tank may be carried on the device carriage with conduit being provided for delivery of cleaning fluid to the brush means. The brush means typically will comprise a generally cylindrical open cell polyester urethane foam body mounted for axial rotation on the cleaning head, the body preferably being relieved in radial axial planes below the body surface to increase flexing of the body when the same is rotatively applied to the aircraft skin surface.

BRIEF DESCRIPTION OF THE DRAWINGS

The invention will be further described in connection with the attached drawing of an illustrative embodiment in which:

FIG. 1 is a plan view of a device according to the invention as may be employed to clean an aircraft skin surface;

FIG. 2 is a side elevational view of the cleaning device in lowered operating position taken along line 2—2 of FIG. 1;

FIG. 3 is an enlarged cross sectional view taken along line 3—3 of FIG. 2;

FIG. 4 is a view greatly enlarged of the cleaning head foam block taken along line 4—4 in FIG. 1;

FIG. 5 is a view like FIG. 2 showing the device in raised and extended operating position; and FIG. 6 is a schematic of the air supply system to cleaning fluid tanks and motor.

DESCRIPTION OF THE PREFERRED EMBODIMENTS

With reference to FIGS. 1 and 2 the present scrubbing device is shown at 1 and includes a carriage 2 having a pivoted pushing or towing handle 3 carrying drag brake 3a, and bogie wheels 4a, fixed wheels 4b underneath. A pair of tanks 5,6 containing cleaning and/or rinsing solutions rest on the carriage frame 7 above the wheels. Above the carriage 2 cleaning wand 8 is provided supported there by the outer end 9 of boom 10, the inner boom end 11 being secured to the carriage by pivot connection 12. A jacking mechanism 13 adapted to raise or lower the boom outer end 9 is provided including hydraulic cylinder 13a secured by pivot connection 14 to the carriage 2 and having its operating rod 15 connected to an intermediate portion 16 of the boom by pivot connector 17. Jacking handle 18 is used to raise the hydraulic jack mechanism 13, 13a.

The cleaning wand 8 is attached to the boom outer end 9 by bracket 19. The cleaning wand 8 comprises a tubular member 20 having a cleaning head at its outer end, comprising a pair of brushes 21, such as foam cylinders 22 as hereinafter described, spray nozzles 23 supported on the wand by angle 24 located to spray cleaning solution delivered to the nozzles from one or both of tanks 5, 6 though supply conduit 25 extending within the wand, onto the brushes. At the opposite end of wand 8 handle 28 is provided suitable for grasping by the device operator and a motor such as an air motor indicated at 26 operating a drive shaft 26a (FIG. 3) to drive the brushes through a gear box 26b, rotatively on axles 27.

Bracket 19 on outer boom end 9 comprises a pair of clamping rings 29, on frame 30 and plastic ring bearings 31 secured by bolts 32 sized to slidably receive the wand intermediate portion allowing advancement and withdrawal of the wand through the bracket. The wand 8 further may be rotated within the bracket. To enable this movement of the wand 8 cleaning solution supply conduit 25 is kept within the wand along the sliding range of bracket 19. Where an air motor 26 is employed to drive the brushes 21, the air is passed from an external supply (not shown) into the wand 8 from air supply line 33 at fitting 34 in the rear of wand handle 28 and then to the motor 26 at the handle. Motor operation is effected by depressing on-off lever 35 to operate a control valve (not shown). Motor speed is adjustable by adjustment of needle valve 35a.

The boom 10 is multisectioned, to be length adjustable. With reference to FIGS. 2, 3 and 5, the boom 10 is seen to comprise an inner section 36 which is a rectangular box member and an outer section 37, a channel member, adapted to overlie the inner section. Outer section 37 is hingedly secured to inner section 36 by hinge 38 to permit cantilevering of the outer section from the end of the inner section, compare FIGS. 2 and 5. Inner section 36 at its outer end is provided with a through opening 40 adapted to receive mounting pin 39. The outer section 37 is secured in its extended relation to the inner section 36 by the hinge 38 and pin 39 carried by the outer section to extend through the opening 40 in the inner section 36 when the outer section is extended. A locking pin 41 carried on chain 42 is inserted transversely through the end of pin 39 to lock the outer section 37 in place. Comparison of FIGS. 2 and 5 illustrates the versatility of the arrangement of boom 10 and wand 8 according to the invention. In FIG. 2, the boom 10 is short and the jacking rod 15 retracted so that wand 8 is relatively low. In FIG. 5, the boom 10 is fully extended and the jacking rod 15 also is extended so that the wand 8 has a very considerable reach. It will be recalled that bracket 19 is sized to permit sliding passage of the wand 8 therethrough whereby the wand may be retracted or advanced through the bracket in any position of the sleeve, as determined by the location of the boom end 9. In addition, the wand 8 is rotatable within the bracket 19 to allow variation of the angle of presentation of the cleaning head brushes 21 to a workpiece.

A further freedom of movement is provided to the wand 8 by the jointed connection of the bracket 19 to the boom 10. As best shown in FIG. 3, a connector joint 43 is provided having a cylindrical terminal portion 44 inserted through opening 40 in boom inner section, or opening 40a in boom outer section 37 if the boom is extended and fastened there against withdrawal by locking pin 41 or 41a on chain 42 or 42a in its transverse bore 45 or 45a respectively, so as to be rotatable, and a jointed portion 46 comprising pivoted yokes 47, one of which is connected to the bracket frame 30 and the other to pin portion 44. The upper transverse bore 45 in pin portion 44 is used when the connector joint 46 is secured at the end of the outer section 37. Jointed portion 46 of the connector joint 43 enables pivoted movement of the bracket 19 and thus the wand 8 about the end of the boom 10 as a fulcrum, while the journaled relation of the connector pin portion 44 to the boom section opening 40 or 40a enables angular movement of the wand about the pin portion as a pivot point.

While various brush means may be employed, for the cleansing of aircraft skin surfaces, for which the present device is highly adapted, it is preferred to employ an open cell polyester urethane foam body as the brush, particularly such a body having a texture coarseness such that there are fewer than 100 pores per linear inch and preferably from fewer than 10 to 25 pores per linear inch. With reference to FIG. 4, it is highly preferred to employ a foam body 22 which is generally cylindrical and mounted for axial rotation on axle 27 and relieved in radial axial planes below its surface 48 by a series of parallel axially extended bores 49 through the body just beneath its surface thus to have increased body flexing when applied to an aircraft skin surface. This structure produces an excellent foaming action with widely used detersive liquids.

The cleaning and/or rinsing liquid is supplied to the brushes 21 by a system of conduits as shown schematically in FIG. 6. Pressurized air from an external source (not illustrated) is introduced through conduit 50 and regulator 51 to tanks 5 and 6, the tank pressures being monitored by gauges 52 and 53 (FIG. 1) and controlled by shut off valves 54 and 55. Liquid in tanks 5 and 6 added through fill openings 56 and 57, shown capped, is forced out of the tanks 5 and 6 or one or them depending on the open or closed condition of valves 58 and 59 in lines 60 and 61 respectively, leading from the tanks into supply conduit 25 which passes up through the wand 8 to the nozzles 23. A portion of source pressurized air is passed along line 33 to the wand handle 28 to power the air motor at 26 which drives the brushes 21 through drive shaft 26a and gear box 26b.

In operation, the scrubbing device is rolled to a workpiece such as an aircraft and locked in position with drag brake 3a or locking brake 3b. Air is supplied to conduit 50 to pressurize the tanks 5 and 6, and to operate the motor through control lever 35. Cleaning liquid in one or both of tanks 5 and 6 is sprayed onto the rotating brushes 21. The brushes 21 are applied to the workpiece surface by manipulation of the wand 8 universally about the connector joint 43 held at an appropriate elevation by the boom 10. Forward and rearward movement of the wand 8 through bracket 19 enables accommodation of curvature in the workpiece surface, while the rotatability of the wand enables variation in the cleaning stroke applied to that surface.

I claim:

1. Portable scrubbing device for cleaning aircraft skin surfaces including cleaning fluid supply means, a carriage, a hand operated wand having a cleaning head at one end and a handle at the opposite end, said cleaning head including a power driven brush means and means supporting the wand intermediate its ends including a boom mounted on the carriage, a swivel connection bracket carried on the boom above the carriage, said wand having an intermediate portion slidably receivable by said bracket to support the wand for pivoted movement to various operating positions by an operator grasping the handle to variously apply the cleaning head to the surfaces to be cleaned.

2. Portable scrubbing device according to claim 1 in which said boom comprises multiple sections to be length adjustable.

3. Portable scrubbing device according to claim 1 including also a motor for driving said brush means and in which said cleaning fluid supply means includes a tank and conduit for delivery of cleaning fluid to said brush means.

4. Portable scrubbing device for cleaning aircraft skin surfaces including a hand operated wand having a cleaning head comprising a motor driven brush means at one end and a handle at the opposite end, a carriage, a cleaning fluid supply tank carried thereon, a boom pivotally mounted on the carriage, a bracket carried for swiveling movement by said boom, and conduit for delivery of cleaning fluid to said brush means, said wand having an intermediate portion slidably receivable by said bracket to support said wand in various operating positions.

5. Portable scrubbing device according to claim 4 which said brush means comprises a generally cylindrical closed cell polyester urethane foam body mounted for axial rotation on said cleaning head, said body being relieved in radial axial planes below the body surface to increase flexing of the body when rotatively applied to an aircraft surface.

6. A portable scrubbing device for cleaning aircraft skin surfaces including a carriage, a pair of fluid supply tanks on the carriage, air supply means communicating air pressure into the tanks, a multiple section boom pivotally secured to the carriage to move in a plane between said supply tanks, a universally movable bracket carried by the boom at the outer end thereof, a hand operated wand having an intermediate portion slidably received in said bracket and supported thereby above said carriage said wand having a cleaning head at one end including axially rotatable polyester urethane foam brush means and a handle at the opposite end, an air motor means communicating with the air supply means to drive the brush means and fluid delivery means for pressurized fluid in the supply tanks to the cleaning head for application by the brush means to the surfaces to be cleaned as determined by the operator directing the location of the cleaning head by manipulation of the wand handle across the bracket to the boom.

* * * * *